A. H. MILLER.
Sugar Evaporator.
No. 28,002.
Patented April 24, 1860.
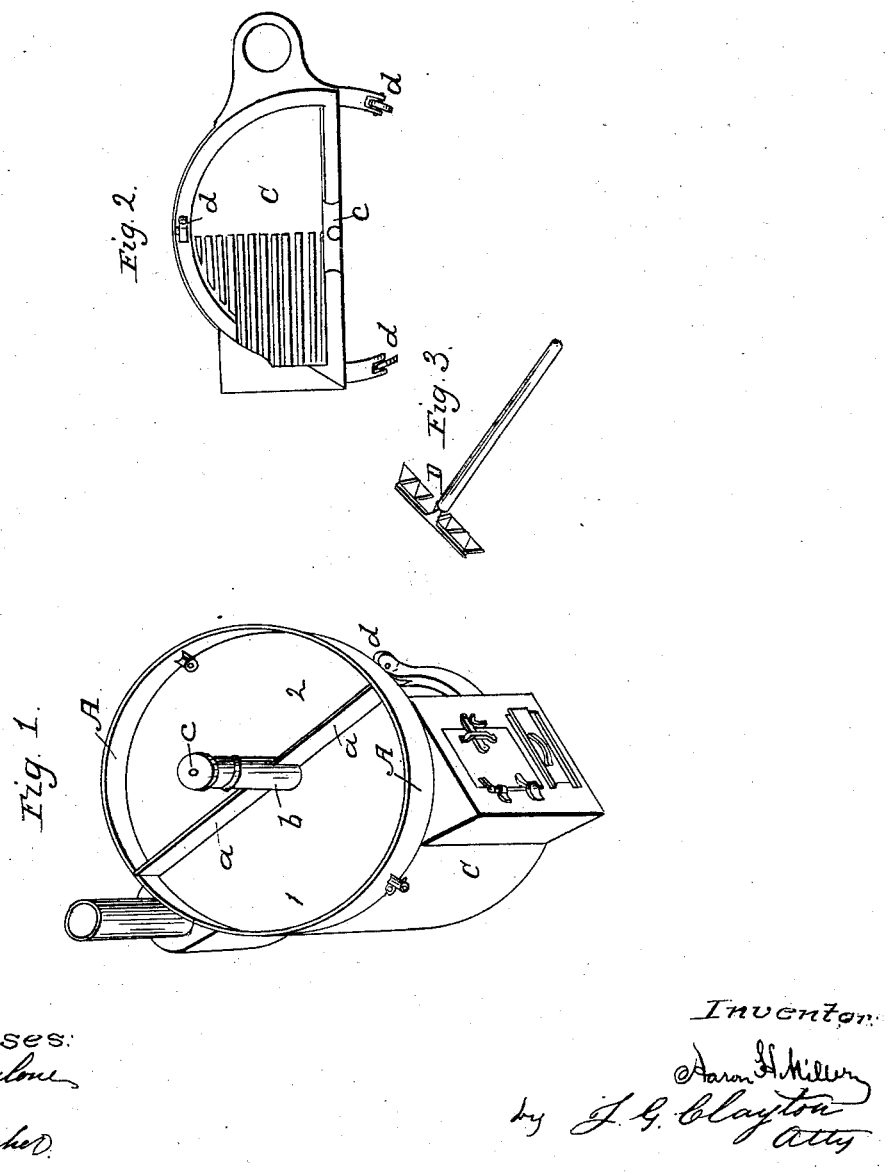

UNITED STATES PATENT OFFICE.

AARON H. MILLER, OF LA PORTE, INDIANA.

IMPROVEMENT IN CONSTRUCTION OF ROTARY EVAPORATORS.

Specification forming part of Letters Patent No. 28,002, dated April 24, 1860.

*To all whom it may concern:*

Be it known that I, AARON H. MILLER, of La Porte, of La Porte county, in the State of Indiana, have invented a new and Improved Sugar-Evaporator, which I verily believe has never before been known or used; and I do hereby declare that the following is a full and exact description thereof, reference being had to the accompanying drawings, and to the letters of reference marked thereon.

Figure 1 is a perspective view. Fig. 2 is a plan view of the heating apparatus, the evaporating-pans being removed. Fig. 3 is a view of the stirrer.

To enable others skilled in the art to make and use my invention, I will describe its construction and operation.

A is the evaporator, divided into compartments 1 and 2 by a strip, $a$. In the center of A is a vertical bearing or journal box, $b$, through which passes spindle $c$, around which the evaporator revolves.

$d\ d\ d$ are rollers attached to the furnace, and serve to lessen the friction caused by the moving of the evaporator.

B and B' are faucets for drawing off the boiled juice from the compartments 1 and 2 of the evaporator.

C is the heating apparatus; D, the rake or stirrer.

The operation of my invention is at once simple and effective in the highest degree, and is as follows: When the evaporator is first placed on the furnace, both compartments 1 and 2 are filled with the juice of the cane. One of these compartments, 1, is now turned by the faucets, which also serve as handles, until it is directly over the furnace, while the other one is removed away from the heat. Fire as intense as can be readily produced is now applied, and the juice is made to boil as rapidly as possible (being meanwhile stirred, to keep from scorching, with stirrer D) until sufficiently concentrated for either sugar or molasses. This compartment 1 is now turned until it changes places with the other, 2, which in turn is heated. When the compartment 1 has been turned off away from the fire, the molasses can be removed by means of faucet B, and another supply of juice be made to take its place; and thus by alternately turning the compartments 1 and 2 off and over the heat, I can continue the evaporating process as long as desired without any waste of time or heat. While one of the compartments is removed from the heat it can be cleansed of the impurities which the juice deposits on the sides and bottom, and which not only retard the boiling, but impair the quality of the sugar.

I am aware the revolving cooking-stoves for cooking purposes are not new, therefore I do not claim such devices; but

What I claim as new, and desire to secure by Letters Patent, is—

The rotary evaporator A, with compartments 1 and 2, constructed and operating substantially as set forth.

AARON H. MILLER.

Witnesses:
JOHN MILLIKAN,
R. HOLMES.